United States Patent [19]

Ginter et al.

[11] 4,347,194
[45] Aug. 31, 1982

[54] POLYHYDROXYL POLYETHER COMPOUNDS CONTAINING PHOSPHORUS

[75] Inventors: Sally P. Ginter, Sanford; Chester E. Pawloski, Bay City; Violete L. Stevens, Midland, all of Mich.

[73] Assignee: The Dow Chemical Co., Midland, Mich.

[21] Appl. No.: 262,264

[22] Filed: May 11, 1981

Related U.S. Application Data

[62] Division of Ser. No. 162,707, Jun. 25, 1980, Pat. No. 4,298,709.

[51] Int. Cl.$^3$ ............................................. C07F 9/09
[52] U.S. Cl. .................................. 260/929; 260/930; 536/117; 546/24
[58] Field of Search ................ 260/929, 930; 546/24; 536/117

[56] References Cited

U.S. PATENT DOCUMENTS 2,892,796  6/1959  McCune ............................ 260/929

FOREIGN PATENT DOCUMENTS 1412384  11/1975  United Kingdom .

*Primary Examiner*—Anton H. Sutto
*Attorney, Agent, or Firm*—Douglas N. Deline; James M. Kuszaj

[57] ABSTRACT

Polyhydroxyl polyether compounds containing at least one monomeric unit each of the formulae:

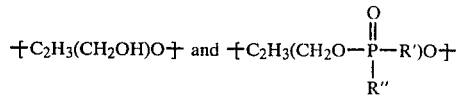

are disclosed. Polymeric condensation resins are prepared by allowing the polyhydroxyl polyethers to react with polyfunctional chain-forming compounds containing functional groups reactive with the hydroxyl groups of polyhydroxyl polyethers. The polyhydroxyl polyether compounds enhance the flame-retardant properties of polymeric condensation resins such as polyurethanes.

9 Claims, No Drawings

POLYHYDROXYL POLYETHER COMPOUNDS CONTAINING PHOSPHORUS

This is a continuation, of application Ser. No. 162,707, filed June 26, 1980, now U.S. Pat. No. 4,298,709.

BACKGROUND OF THE INVENTION

The present invention relates generally to polyhydroxyl polyether compounds and polymeric resins prepared therefrom.

Polymeric resins have found wide and varied use in industry. For example, polyurethane foams are commercially used in the fields of insulation, structure reinforcement, cushioning, upholstery, electrical encapsulation, and the like. Unfortunately, polymeric resins, such as the polyurethanes, generally have very little inherent resistance to burning. In view of the extensive commercial interest in polymeric resins, there have been numerous attempts to develop an effective flame-retardant polymeric resin.

One approach to imparting flame retardancy to polymeric resins has been to incorporate a flame-retardant additive within the resin. Illustrative of such additives are: antimony oxide, tris(dibromopropyl)phosphate, chlorinated biphenyls, halogenated hydrocarbons, and the like. These additives are not chemically bonded to the polymeric backbone of the resin, but are merely physically dispersed within the resin. Consequently, such additives have the disadvantage of being especially susceptible to leaching and vaporization during aging and use of the polymeric resins.

Another approach to imparting flame retardancy to polymeric resins has been to employ a reactive flame-retardant material as an integral part of the polymeric backbone. Polyhydroxyl polyether compounds containing halogen and/or phosphorus atoms have been so used.

Such polyhydroxyl polyether compounds are a well-known class of compounds generally prepared by the polymerization of one or more monomers containing an oxirane functional group

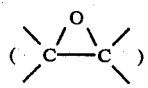

with a chain-initiating agent. Representative examples of polyhydroxyl polyether compounds which have found use in polymeric resins are: the trichlorobutylene oxide-based polyols described in U.S. Pat. No. 3,269,961; the trichloropropylene oxide-based polyols described in U.S. Pat. No. 3,402,169; the epichlorohydrin-based polyols described in U.S. Pat. Nos. 3,255,126, 4,072,638, 4,020,024 and Great Britain Pat. No. 1,412,384; and the trichloroethyl phosphate-based polyols described in U.S. Pat. Nos. 3,767,732 and 3,764,640.

However, for any class of flammable material, those skilled in the art have long been aware that some reactive flame-retardant materials are more effective in polymeric resins than other reactive flame-retardant materials. This is because the efficacy of any flame retardant in polymers of polymeric compositions is measured not only by the ability of the material to impart flame retardancy to the polymer, but also by the ability of the flame retardant to improve or modify, or at least not to detract from, other physical or mechanical properties of the polymer or polymeric composition.

Thus, the mere fact that a compound contains halogen and phosphorus atoms does not assure that the compound can provide usable flame retarding characteristics to the polymeric resin without substantially affecting other properties of the resin. For example, the conventional polyhydroxyl polyether compounds described above can be used to produce polymeric resins having flame-retardant properties. However, other physical properties of the polymeric resins, such as humid aging characteristics and friability are generally adversely affected. Moreover, the formulation of the polymeric resins from conventional polyhydroxyl polyether compounds is rendered more difficult because of the predominance of terminal secondary hydroxyl groups on the polymeric backbone. These secondary hydroxyl groups are well-known in the art to be much less reactive to the formulation of polymeric resins than primary hydroxyl groups.

It would therefore be desirable to provide a polyhydroxyl polyether compound which is not only capable of imparting good flame retarding characteristics to a polymeric resin, but which is also capable of insuring commercially acceptable physical properties (e.g., humid aging, friability) in the resin. Moreover, it would be advantageous if such a polyhydroxyl polyether compound had a predominance of reactive primary hydroxyl group incorporated within the polymeric backbone of the polyether.

SUMMARY OF THE INVENTION

Polyhydroxyl polyether compounds having the above-described characteristics have now been discovered.

The compounds have the general formula:

where

R is the residue left by the removal of n active hydrogen atoms from an initiator compound for alkylene oxide polymerization $RH_n$;

Y is independently —H, —$CH_3$, —$C_2H_5$, —$CH_2Cl$, —$CH_2CCl_3$, —$CH_2Br$,

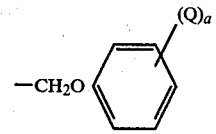

where

Q is independently —Cl or —Br and a=1–5, or —$CH_2OX$ where

X is independently —H or

and R' and R" are each independently alkyl, phenyl, haloalkyl, halophenyl, alkoxy, haloalkoxy, polyhaloalkoxy, dialkylamino, diarylamino, phenoxy, halophenoxy, or alkylhalophenoxy of up to about 20 carbons;

provided that at least one Y is —CH₂OH and at least one Y is

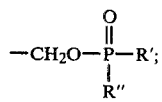

and m and n are integers such that m is at least 2, n being 1–8.

Polymeric condensation resins are also disclosed. These resins comprise the reaction product of the polyhydroxyl polyether compounds described above with polyfunctional chain-forming compounds containing functional groups reactive with hydroxyl groups of the polyhydroxyl polyether to yield a polymeric condensation resin.

The present compounds offer numerous advantages over conventional polyhydroxyl polyether compounds in the preparation of polymeric condensation resins. First, due to the predominance of primary hydroxyl groups within the polymeric backbone, the present compounds exhibit an increased reaction rate with polyfunctional chain-forming compounds. Second, the distribution of primary hydroxyl groups within the polymeric backbone of the compounds can be random or specifically placed. This ability to position primary hydroxyl groups along the polyalkylene chain backbone creates a variety of cross-linking options. Third, the high halogen and phosphorus atom content of the compounds allow excellent flame-retardant properties to be imparted to the polymeric resin. Fourth, the present compounds produce polymeric resins with lower friability than resins prepared from conventional polyols. Fifth, humid aging studies of polymeric resins produced with the compounds of the present invention indicate that the resins so produced exhibit superior resistance to humid aging than resins prepared from commercially available polyhydroxyl polyether compounds. Finally, the present compounds are generally of lower viscosity than conventional polyhydroxyl polyether compounds.

DETAILED DESCRIPTION OF THE INVENTION

Compounds of formula (I) are linear polyhydroxyl polyethers containing at least one monomeric oxyalkylene unit each of the formulae:

$$\{C_2H_3(CH_2OH)O\} \quad (II)$$

and

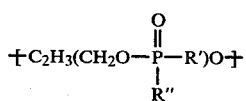

where R' and R'' have the meaning described above.

The term "linear" as used herein, refers to each of the oxyalkylene backbone chains $\{C_2H_3(Y)O\}$ attached to the initiator residue R. Obviously, if n in formula (I) exceeds 2, the molecule as a whole could be considered to be branched.

The oxyalkylene units have been depicted by the general formula $\{C_2H_3(Y)O\}$. This formula corresponds to the structural isomeric formulae:

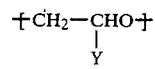

and

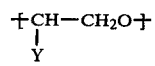

The compounds of formula (I) are prepared from linear homopolymrs or copolymers of tert-butyl glycidyl ether (hereinafter TBGE), an epoxide having the structural formula:

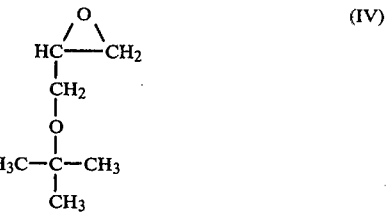

The polymerization of TBGE is well-known in the art and is generally carried out by condensing TBGE, or TBGE and one or more other cyclic ether monomers, with an initiator compound in the presence of a catalyst. The preparation of polymers of TBGE is described in U.S. Pat. No. 3,519,559, which is incorporated herein by reference.

When TBGE is polymerized, the oxirane ring is opened with the breaking of an oxygen bond to form a bivalent radical oxyalkylene linkage. A generalized condensation polymerization reaction involving TBGE and a comonomer is illustrated by the formula:

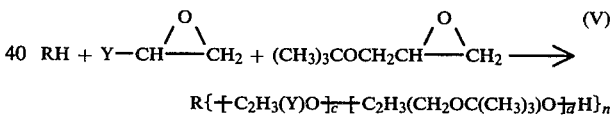

where R, Y and n have the meaning described above and c and d are integers signifying the number of equivalents of comonomer or TBGE reacted for each reactive hydroxyl functionality.

To produce the compounds of formula (I), the tert-butoxy groups of TBGE polymer of formula (V) are removed and replaced with primary hydroxy groups as shown by the generalized reaction:

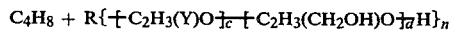

The debutylation of the t-butyl ether on the polymeric backbone can be achieved by warming the polymer in the presence of an aryl sulfonic acid, as shown in U.S. Pat. No. 4,048,237.

In a final step, any desired proportion of the primary hydroxyl groups of debutylated polymer of formula (VI) can be reacted with an organophosphorus compound capable of replacing at least a portion of the primary hydroxyl groups with a phosphate of the formula:

 (VII)

where R' and R" have the meaning described above. The generalized reaction is illustrated by the equation:

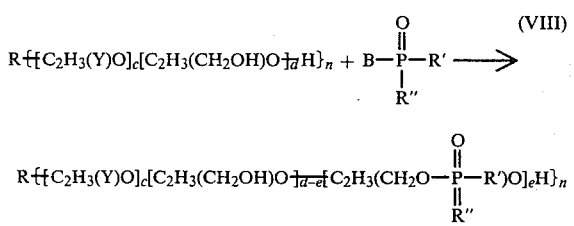 (VIII)

where B is hydrogen or halogen and e is an integer equal to the number of equivalents of primary hydroxyl groups replaced by organo phosphorus groups. In practice the two reactants are combined in the presence of an acid acceptor and if B is hydrogen, preferably in a halogenated solvent, such as carbon tetrachloride.

Organophosphorus compounds suitable for use include compounds of the formula:

 (IX)

where B, R' and R" have the meaning described above.

The amount of the organophosphorus compound reacted with the primary hydroxyl groups can vary depending upon the desired phosphorus content of the final product. For example, where the polyhydroxyl polyether is employed as a flame-retardant reactant in the preparation of polyurethane resins, it is desirable to provide sufficient organophosphorus compound to produce a final polyhydroxyl polyether compound containing from about 0.1 to about 20 percent by weight phosphorus.

A wide range of compounds containing at least one reactive hydrogen atom and having the general formula $RH_n$ can be used to initiate the TBGE polymerization reaction. The term "active hydrogen atoms" as used herein designates hydrogen atoms which are reactive as determined by the Zerewitnoff method.

Suitable initiator compounds are those that function as initiators for alkylene oxide polymerization and have not more than 8 reactive hydrogen atoms ($n=8$), preferably not more than 3 reactive hydrogen atoms ($n=3$). Preferred initiators are polyhydroxyl compounds containing one or more halogen or phosphorus atoms. Representative initiator compounds that may be employed are: alkanols, such as methanol, butanol, octanol, dodecanol and octadecanol; the alkenols, such as allyl alcohol, 10-undecen-1-ol, oleyl alcohol, and the like; alkylene glycols, such as ethylene, propylene, butylene, 1,4-tetramethylene and 1,3-hexylene glycols; the higher aliphatic polyols such as glycerol, pentaerythritol, sorbitol, sucrose, hexanetriol, alkylene oxide adducts thereof and the like; phenols, such as phenol, cresols, xylenols, hydroquinone, resorcinol, naphthols, bisphenols, and the like; aralkanols, such as benzyl alcohol and phenethyl alcohol, and the like; halogenated alcohols and polyols, such as 2-(pentachlorophenoxy)ethanol, 1,3-dibromo-2-propanol, 1,3-dichloro-2-propanol, dibromoneopentyl glycol, monobromoneopentyl triol, tribromoneopentyl alcohol, 2,2,2-tribromoethanol, 2,4,6-tribromophenoxyethanol, tribrominated-bis-[pentaerythritol ether], 2,3-dibromo-1, 4-butenediol, 2-chloro-1-ethanol, 1-chloro-2-propanol, 3-chloro-1,2-propanediol, 2,3-dichloro-1-propanol, 2,3-dibromo-1-propanol and the like; halogenated acids such as trichloroacetic acid, pentachlorophenoxy acetic acid and the like; halogenated pyridinols such as 3,5,6-trichloro-2-pyridinol, 3,4,5,6-tetrachloro-2-pyridinol and the like. Representative phosphorus-containing hydroxyl compounds that may be employed are phosphoric acid, phosphorus acid, trichloromethyl phosphonic acid, propyl phosphonic acid, chloromethyl phosphonic acid, phenylphosphonic acid, and the like. The preferred initiator compounds are phosphoric acid, dibromoneopentyl glycol, 2,3-dibromo-1,4-butenediol, ethylene glycol, 2-butanol, dibromopropanol, pentachlorophenoxy ethanol.

Since all practical methods for making the compounds of formula (I) involve the condensation polymerization of the initiator compound with TBGE, one or more other cyclic ether monomers can be copolymerized with the TBGE in this step. Suitable monomers containing an oxirane functionality have the generalized formula:

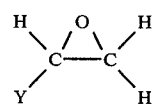

Representative of this class of monomers are compounds wherein Y is —H (ethylene oxide), —$CH_3$ (1,2-propylene oxide), —$C_2H_5$ (1,2-butylene oxide), —$CH_2Cl$ (epichlorohydrin), —$CH_2CCl_3$ (trichlorobutylene oxide), —$CH_2Br$ (epibromohydrin),

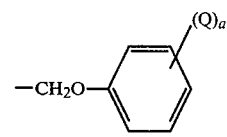

where Q is —Cl or —Br and $a=1$-5 (pentachlorophenyl glycidyl ether, 2,4,6-tribromophenyl glycidyl ether), mixtures thereof, and the like. In applications wherein the compounds of the present invention are employed to impart flame-retardant properties to polymeric resins, it is preferred that TBGE be copolymerized with at least one cyclic ether monomer containing a halogen atom. The preferred monomers in many applications are epichlorohydrin, epibromohydrin and mixtures thereof.

The amount of monomer copolymerized with TBGE can vary depending upon the properties desired in the final polyhydroxyl polyether product. For example, where the product is to be employed as a flame-retardant reactant in polymeric resins, sufficient amounts of a halogenated monomer are copolymerized to produce a halogen content in the final polyhydroxyl polyether of formula (I) sufficient to allow the polymeric resin to pass a designated test for flame retardance. Preferably, the halogen content in the polyhydroxyl polyether compound is from about 20 percent to about 60 percent by weight.

The monomers may be copolymerized with TBGE in a heteric (random) fashion, wherein the monomers are reacted simultaneously, or they may be reacted to form block copolymers, wherein the monomers are reacted sequentially in any desired sequence and proportions. The number of oxyalkylene units in the polymer chains (m in the formula (I)) may vary from two to many thousands, depending on the monomers and catalyst used in its preparation.

The polyhydroxyl polyether compounds of the present invention are characterized by the wide range of utility common to all polyhydroxyl polyethers. However, the present compounds are particularly useful in applications where the presence of varying amounts of halogen and phosphorus atoms and a preponderance of primary hydroxyl groups in a linear polymeric backbone are of special value. Thus, in one embodiment, the compounds of the present invention can be reacted with polyfunctional chain-forming compounds containing functional groups reactive with the hydroxyl groups to give a more complex polymeric resin having enhanced flame-retardant properties. For example, the polyhydroxyl polyether compounds can be reacted with such polyfunctional chain-forming compounds, as, for example, organic polyisocyanates to form polyurethanes, organic polycarboxylic acids to form polyesters, organic isocyanurates to form modified polyisocyanurates, and polyepoxides to form higher weight polyepoxides.

The methods of preparing polymeric resins from polyfunctional chain-forming compounds and polyhydroxyl polyether compounds are well-known in the art. For example, a detailed description of the chemistry and technology of polyurethane, polyisocyanurate, polyester and polyepoxide polymeric resins can be found in *Encyclopedia of Polymer Science and Technology*, Interscience Publishers (1971) which is incorporated herein by reference.

In one embodiment of the present invention, the polyhydroxyl polyether compounds are employed as reactants in the production of flexible, rigid, and semi-rigid flame-retardant polyurethane foams. Such flame-retardant foams are produced by reacting together (a) at least one organic polyfunctional isocyanate, (b) a flame-retardant amount of at least one polyhydroxyl polyether of formula (I), (c) an effective amount of a polyurethane blowing agent and, and (d) an effective amount of a polyurethane catalyst for promoting the reaction between the organic polyisocyanate and the polyhydroxyl polyether, are (e) a suitable surfactant.

By the term polyfunctional isocyanate is included both monomeric polyfunctional isocyanates, such as diisocyanates, and polymeric polyisocyanates. Representative examples of organic polyfunctional isocyanates that can be used to make the polyurethane foams include: 2,4-tolylene diisocyanate, 2,6-tolylene diisocyanate, phenylene diisocyanate, 1,7-naphthylene diisocyanate, 1,5-naphthylene diisocyanate, 4,4'-diphenylmethane diisocyanate, 4,4'-diphenyl diisocyanate, methylene diisocyanate, trimethylene diisocyanate, tetramethylene-1,4-diisocyanate, 1,4-butylene diisocyanate, 2,3-butylene diisocyanate, 1,4-cyclohexylene diisocyanate, 1,3-cyclopentylene diisocyanate, cyclohexylene-1,2-diisocyanate, diphenyl-3,3'-dimethyl-4,7-diisocyanate, xylylene diisocyanate, cyclohexane-1,7-diisocyanate, 1-methoxyphenyl-2,4-diisocyanate, 1,2,4-benzene triisocyanate, polymethylene polyphenylisocyanate, tolylene-2,4,6-triisocyanate, 4,7'-dimethyldiphenyl methane-2,2',5,5'-tetraisocyanate, 7,4'-biphenylene diisocyanate, triphenylmethane-7,4',4"-triisocyanate, cumylene 2,4-diisocyanate, durylene diisocyanate, 2,4-diphenylhexane-1,6-diisocyanate, 2-chlorotrimethylene diisocyanate, diphenyl-2,4,4-triisocyanate, dodecane-1,12-diisocyanate, cyclobutane-1,3-diisocyanate, hexahydrotolylene-2,4-diisocyanate, 1-methyl-2,4-diisocyanatocyclohexane, mixtures and polymers thereof, and the like.

By employing polyhydroxyl polyethers of the invention having various degrees of functionality in combination with polyfunctional isocyanates of varied functionality, foams having any desired amount of flexibility ranging from flexible, semi-flexible to rigid may be produced.

The amount of polyfunctional isocyanate employed in the preparation of the polyurethane foams should be sufficient to provide at least 0.7 NCO groups based on the number of hydroxyl groups present in the polyhydroxyl polyether component and any other component. An excess of the polyfunctional isocyanate can be employed. However, this is generally limited due to the high cost of the polyfunctional isocyanate component. It is preferable, therefore, to employ no greater than 2.0 NCO groups based on the number of hydroxyl groups and preferably between about 0.9 to 1.2 NCO groups.

A catalyst for the reaction between the polyfunctional isocyanate and the polyhydroxyl polyether compounds is usually desirable when cellular polyurethane foams are produced. The catalyst employed can be any of the catalysts known to be useful for this purpose, including tertiary amines and metallic salts. Representative examples of suitable catalysts include: triethylene diamine, dibutyltin dilaurate, triethylamine, N,N-dimethylcyclohexylamine, cobalt naphthenate, stannous octoate, N-methyl morpholine, N-hydroxyethyl morpholine, and the like. Generally, the catalyst is employed in an amount of from about 0.01 to about 5 percent by weight based on the total polyol content of the reaction mixture.

The blowing agent employed in preparing the polyurethane foams can be any of those known to be useful for this purpose, such as aliphatic hydrocarbons boiling below 110° C. or halogenated aliphatic hydrocarbons, boiling below 110° C., and mixtures thereof. Typical halogenated hydrocarbons include the following: monofluorotrichloromethane, difluorodichloromethane, 1,1,2-trichloro-1,2,2-trifluoroethane, methylene chloride, chloroform, hexane, hexene, pentane, carbon tetrachloride, and the like. The choice of blowing agent is influenced by the type of polyurethane foam which is desired. For example, methylene chloride is a suitable blowing agent for flexible polyurethane foams but is not suitable for rigid polyurethane foams since the latter are solubilized by methylene chloride. Some blowing agents such as difluorodichloromethane are suitable for either flexible or rigid polyurethane foams. Suitable blowing agents are disclosed in U.S. Pat. No. 3,072,582. The amount of the foaming agent employed may be varied within a wide range depending upon the properties desired in the foam. Generally, however, the blowing agent is employed in an amount of from about 10 to about 50 parts by weight of the polymeric formulation.

It is preferred in the preparation of polyurethane foams to employ minor amounts of a surfactant in order to improve the cell structure of the resulting foam.

Illustrative of such surfactants are polypropylene glycols having molecular weights between 2000 and 8000, the liquid silicone-glycol copolymers having viscosities of from 350 to 3500 centistokes at 77° F. and polysiloxane polyoxyalkylene block copolymers as described in U.S. Pat. No. 2,834,748.

If desired, cell-size control agents, synergists such as antimony oxide, fillers, pigments, emulsifiers, water, inhibitors against discoloration and aging, and other additives can also be added to the urethane reaction mixture.

Additional polyfunctional hydroxyl compounds can be employed to supplement the polyhydroxyl polyether compounds as reactant in forming polyurethanes. Suitable polyfunctional hydroxyl compounds for use in the manufacture of polyurethanes include glycols, triols, hexols, octols, polyester polyols, and polyether polyols. Illustrative of such compounds are the alkylene oxide adducts of water or any of the following polyhydroxy-containing organic compounds: ethylene glycol, diethylene glycol, propylene glycol, dipropylene glycol, trimethylene glycol, butylene glycols, glycerine, 1,2,6-hexanetriol, 1,1,1-methyolethane, 1,1,1-trimethyolpropane, 3-(2-hydroxyethoxy)-1,2-propanediol, pentaerythritol, 1,2-cyclohexanediol, fructose, sorbitol, sucrose, lactose, glycosides, resorcinol, pyrogallol, phloroglucinol, di-, tri- and tetra-phenylol, alkanol amines, higher alkylene oxide adducts of the foregoing and the like.

The amount of the flame-retardant polyhydroxyl polyether compound of this invention which is incorporated into any particular polyurethane reaction mixture depends on several factors including the degree of flame retardancy desired, whether an additional flame retardant is employed, the chemical composition of the polyurethane material, the physical nature (i.e., cellular or non-cellular), the density, and with respect to cellular polymers, the nature of the cellular structure (i.e., flexible, semi-flexible or rigid).

It is recognized, however, that all known organic polymers will burn when subjected to a sufficiently intense heat source. Thus, terms such as "flame retardant" and "flame spread rating" are not intended to indicate performance under actual fire conditions.

The urethane polymerization reaction can be conducted by any of the three principal reaction methods: (a) prepolymer; (b) semi- or quasi-prepolymer; and (c) one-shot. In the "one-shot" procedure, the polyhydroxyl polyether compound, the organic polyfunctional isocyanate, and other components (i.e., additional polyfunctional hydroxyl compounds, catalyst, blowing and surfactant agents) are mixed simultaneously. In the prepolymer method, the polyhydroxyl polyether compound, and optionally other polyfunctional hydroxyl compounds are mixed with an excess of the organic polyfunctional isocyanate before the other components are added. In the semi- or quasi-prepolymer method, the organic polyfunctional isocyanate is reacted with a portion of the polyhydroxyl polyether compound and optionally with a portion of any other polyfunctional hydroxyl compound, producing a low molecular weight polymer of low viscosity. This semi-polymer is then reacted with the remainder of the polyhydroxyl polyether compound and optionally with the remainder of any additional polyfunctional hydroxyl compound.

The polyurethane polymeric compositions produced can be made into useful articles by conventional molding, casting, coating, and laminating techniques, all of which are well-known in the art.

In a manner substantially identical to that used to produce polyurethane foams, the polyhydroxyl polyether compounds of the present invention can be employed as reactants in the production of flame-retardant polyisocyanurate foams. Such foams are produced by reacting together (a) at least one organic polyisocyanate, (b) a flame-retardant amount of at least one polyhydroxyl polyether of formula (I), (c) an effective amount of a polyisocyanurate blowing agent, (d) an effective amount of an isocyanate-trimerization catalyst, and optionally (e) a surfactant.

Any of the organic polyisocyanates, blowing agents and surfactants employed in the preparation of the polyurethane foams can be used in the preparation of the polyisocyanurate foams.

The isocyanurate-trimerization catalysts used in the preparation of polyisocyanurates are compounds which have a catalytic activity for trimerizing isocyanate groups. Typical isocyanate-trimerization catalysts include: (a) tertiary amines such as triethylamine, N,N',N''-tris(dimethylaminopropyl) hexahydrotriazine, 2,4,6-tris(dimethylaminomethyl) phenol, tetramethyl ethylenediamine; (b) mixtures of the tertiary amine and a promoter, such as ethanol, mono-N-substituted carbamic acid esters, water, aliphatic aldehydes, tertiary amines, benzoyl peroxide, ethylenecarbonate, α-diketones (e.g., diacetyl) and various epoxy compounds; (c) tertiary phosphines such as triethyl phosphine; (d) alkali metal salts of imides such as potassium phthalimide and sodium succinimide; (e) organic onium compounds such as tetraethyl ammonium hydroxide, benzyl triethylammonium hydroxide, tetraethyl phosphonium hydroxide, trimethyl sulfonium hydroxide; (f) ethyleneimines such as N-butyl ethyleneimine and 2-hydroxyethyl ethyleneimine; (g) metal salts of carboxylic acid such as potassium acetate, potassium 2-ethylhexanoate, lead 2-ethylhexanoate, sodium benzoate, potassium naphthenate and tin octanoate; (h) basic inorganic compounds such as potassium carbonate, calcium hydroxide, barium oxide, potassium hydroxide and sodium hydroxide; (i) alcolates and phenolates such as sodium methoxide, potassium phenolate and sodium trichlorophenolate; (j) Ti- and Sb-compounds such as tetra-butyl titanate and tri-n-butyl antimony oxide; (k) Friedel-Crafts catalysts such as zinc chloride, tin chloride, ferric chloride, antimony pentachloride, aluminium chloride and borontrifluoride; (l) alkali metal complexes such as alkali metal complexes of salicylaldehyde, acetylacetone, o-hydroxyacetophenone or quinizarine and alkali metal complexes of tetra-valent boron compounds.

The amount of the polyisocyanate employed in the preparation of the polyisocyanurate foams should be sufficient to provide at least about 1.5 NCO groups based on the number of hydroxyl groups present in the polyhydroxyl polyether component and any other component. An excess of the polyisocyanate can be employed up to about 15 isocyanate equivalents for each hydroxyl equivalent. However, it is preferable to employ from about 2.0 to about 6.0 NCO groups based on the number of hydroxy groups.

In another embodiment of the present invention, the polyhydroxyl polyether compounds are employed as reactants in the production of flame-retardant saturated and unsaturated polyesters. Such flame-retardant foams are produced by reacting together (a) at least one saturated or unsaturated organic polycarboxylic component and (b) a flame-retardant amount of at least one polyhydroxyl polyether of formula (I).

Any saturated or unsaturated organic polycarboxylic compound can be employed in the preparation of the polyester. By organic polycarboxylic compound is meant the organic polycarboxylic acids, organic polycarboxylic anhydrides, organic polycarboxylic acid halides, and organic polycarboxylic acid esters. Suitable unsaturated polycarboxylic acids having aliphatic carbon-to-carbon double bonds, and the corresponding acid halides, esters, and anhydrides can include maleic, fumaric, chloromaleic, ethylmaleic, itaconic, citraconic, zeronic, pyrocinchoninic, mesaconic, aconitic and acetylene dicarboxylic, either alone or in mixtures. The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic and mixtures thereof.

When an unsaturated anhydride such as maleic anhydride is used, an unsaturated polyester is produced which contains polymerizable double bonds. Curing by copolymerization of a reactive, volatile monomer such as styrene with the unsaturated polyester results in a three dimensional rigid network. In addition to styrene, a variety of ethylenically unsaturated monomers such as methyl methacrylate, vinyl toluene, α-methyl styrene, divinyl benzene, the halogenated styrenes, diallyl phthalate, triallyl cyanurate or mixtures of the above may be used. Additional monomers are also listed on page 30, Table II-1.7 in "Handbook of Reinforced Plastics" 1964, S. S. Oleesky and G. Mohr, Reinhold Publishing Corp., New York. The particular choice of monomer and the specific composition of the unsaturated polyester are dependent on the properties ultimately desired in the cured article and are known or readily determined by those skilled in the art. Additional valuable information useful in selecting the resin and monomer can also be found on pages 13–55 in the above reference.

In yet another embodiment of the present invention, the polyhydroxyl polyether compounds can be employed in the synthesis of higher molecular weight epoxy resins by reacting (a) at least one polyepoxide; (b) at least one polyhydroxyl polyether of formula (I); and (c) a suitable catalyst. The synthesis of such higher-molecular weight polyepoxides is described, for example, in *Handbook of Epoxy Resins,* H. Lee, K. Neville, McGraw-Hill Book Company, New York 1967, pages 2-6 to 2-9, which reference is incorporated herein by reference.

The invention has been described in detail with particular reference to certain preferred embodiments thereof, but it will be understood that variations and modifications can be effected within the spirit and scope of the invention.

The invention is further illustrated by the following examples.

EXAMPLE 1

Part A-Preparation of TBGE-Epichlorohydrin Copolymer

Monomeric tert-butyl glycidyl ether (TBGE) was copolymerized with epichlorohydrin using 2,3-dibromo-1,4-butenediol to initiate the polymer chain. The reaction was conducted in a two-liter, three-necked flask equipped with a stirrer and reflux condenser. Into the flask were placed 500 milliliters (ml) of methylene chloride, 105 grams (g) of 2,3-dibromo-1,4-butenediol (0.4 mole), and 3 ml boron trifluoride etherate. The resulting mixture was stirred and heated to reflux. A solution of 474 g epichlorohydrin (5.12 moles) and 224 g TBGE (1.72 moles) was then added to the refluxing mixture at a sufficient rate to maintain a gentle reflux.

The resulting reaction mixture was stirred at reflux until all the TBGE and epichlorohydrin had reacted, thus assuring that the molar proportions of each component in the product were the same as in the reactor feed.

The completion of the reaction was determined by the "epoxy test". In this test, 2 ml of the reaction mixture were added to 10 ml of an acetic acid solution containing 20 percent by weight tetraethylammonium bromide. Five drops of 1 percent by weight crystal violet dissolved in 1 g of acetic acid was added to the test solution. When the test solution turned green, the reaction was complete.

Part B-Dealkylation of the TBGE-Epichlorohydrin Copolymer

When the reaction described in Part A was complete, 3 g of p-toluenesulfonic acid hydrate were added to the reaction mixture. The mixture was then heated at about 130° C. until dealkylation of the t-butyl moiety was complete. The mixture was allowed to cool to room temperature and then 700 ml of methylene chloride and 500 ml of an aqueous NaOH solution were added. The resulting product layer was separated. The polymeric product was essentially free of t-butyl groups as demonstrated by nuclear magnetic resonance spectroscopy (NMR).

Part C-Reaction of TBGE-Epichlorohydrin Copolymers With Organophosphorus Compound A 165 g (0.1 mole) portion of the TBGE-epichlorohydrin copolymer of Part B was mixed with 50 ml carbon tetrachloride, 400 ml methylene chloride, 15 g (0.1 mole) diethyl hydrogen phosphite, and 15 g (0.1 mole) triethylamine in a 1-liter flask. The resulting mixture was stirred at reflux for about 8 hours. After 8 hours, the mixture was cooled and mixed with 200 ml of water. The product layer was then separated, dried over sodium sulfate, filtered, and distilled at 60° C. under reduced pressure to remove solvent. About 179 g of product (95 percent yield) was isolated. NMR analysis showed complete reaction of the diethyl hydrogen phosphite.

The principal properties of the polyhydroxyl polyether product obtained are shown in Table I.

EXAMPLES 2–7

In a manner substantially as described in Example 1, the polyhydroxyl polyethers described in Table I were prepared.

TABLE I

| Example | Reactants Component | Molar/Ratio | Mol Wt | OH Funct | Product % Cl | % Br | % P | Viscosity (77° F.) CPS | n | m |
|---|---|---|---|---|---|---|---|---|---|---|
| 1 | Di Br Butenediol | 1 | 1789 | 5 | 23.8 | 8.9 | 1.7 | 54,000 | 2 | 16 |
|   | Epi-Cl | 12 | | | | | | | | |
|   | TBGE | 4 | | | | | | | | |
|   | DEHP | 1 | | | | | | | | |
| 2 | Dipentek | 1 | 1838 | 4 | 23.0 | 13.0 | 1.7 | — | 2 | 14 |
|   | Epi-Cl | 12 | | | | | | | | |
|   | TBGE | 2 | | | | | | | | |
|   | DEHP | 1 | | | | | | | | |
| 3 | PCl PEtOH | 1 | 1853 | 4 | 32.6 | — | 1.7 | — | 1 | 16 |
|   | Epi-Cl | 12 | | | | | | | | |
|   | TBGE | 4 | | | | | | | | |
|   | DEHP | 1 | | | | | | | | |
| 4 | MeOH | 1 | 1574 | 4 | 27.0 | — | 2.0 | — | 1 | 16 |
|   | Epi-Cl | 12 | | | | | | | | |
|   | TBGE | 4 | | | | | | | | |
|   | DEHP | 1 | | | | | | | | |
| 5 | MeOH | 1 | 1826 | 4 | 23.3 | — | 3.4 | — | 1 | 17 |
|   | Epi-Cl | 12 | | | | | | | | |
|   | TBGE | 5 | | | | | | | | |
|   | DEHP | 2 | | | | | | | | |
| 6 | DBNPG | 1 | 1793 | 5 | 23.8 | 8.9 | 1.7 | 75,000 | 2 | 16 |
|   | Epi-Cl | 12 | | | | | | | | |
|   | TBGE | 4 | | | | | | | | |
|   | DEHP | 1 | | | | | | | | |
| 7 | Phosphoric Acid | 1 | 1492 | 4 | 28.6 | — | 4.2 | 45,000 | 3 | 14 |
|   | Epi-Cl | 12 | | | | | | | | |
|   | TBGE | 2 | | | | | | | | |
|   | DEHP | 1 | | | | | | | | |

Note:
MeOH = methanol
Epi-Cl = epichlorohydrin
TBGE = tert-butyl glycidyl ether
DEHP = diethylphosphonate
PCl PEtOH = pentachlorophenoxyethanol
Di Pentek = tribrominated-bis[pentaerythritol ether]
Di Br Butenediol = 2,3-dibromo-1,4-butenediol
DBNPG = dibromoneopentyl glycol

EXAMPLE 8

Preparation of Polyurethane Resin Composition

Using the polyhydroxyl polyether compound prepared in Example 1, Part C, a polyurethane foam was prepared by adding an organic polyisocyanate to a well stirred mixture of the polyhydroxyl polyether and the other reaction components described in Table II, Part A. The resulting mixture was mechanically stirred for about 10 seconds, and then was poured into a cylindrical container prior to the reaction cream time. The foam was then allowed to cure at ambient temperature.

The resulting foam was subjected to the West German DIN 4102-B2 test for "Behavior of Building Materials and Components in Fire; Building Materials; Definitions, Requirement and Test". The physical properties of the polyurethane foams were measured by conventional methods. The physical properties of the foam and DIN 4102 test results are described in Table II, Part B.

TABLE II

Part A - Resin Formulation

| Component | Example 1 |
|---|---|
| F. R. Polyol | 15.0 g |
| Polyhydroxy (a) | 85.0 g |
| Tin-based Catalyst (b) | 0.2 g |
| Amine Catalyst (c) | 1.0 g |
| Blowing Agent (d) | 38.0 g |
| Polyisocyanate (e) | 124.0 g |

Part B - Properties of Resin

| Property | Example 1 |
|---|---|
| Cream Time (sec) | 12.0 |
| String Time (sec) | 29.0 |
| Tack-free Time (sec) | 45.0 |
| Density (kg/m$^3$) | 32.0 |
| Humid Aging (% Volume Change) (28 Days, 70° C., 100% R.H.) | 10.7 |
| Compressive Strength ASTM D-1621-64 parallel to foam rise (psi) | 9.9 |
| perpendicular to foam rise (psi) | 36.4 |
| Flammability Test (DIN 4102-B2) | Passed |
| Friability (%) ASTM C-3421-61 | 7.8 |
| Insulating (K) Factor ASTM C-1777-71 | 0.138 |

Notes
(a) a blend of 50 parts by weight of an ethylene-diamine-initiated propylene oxide polymer having hydroxyl number 640 and functionality of 4.0 and 50 parts by weight of a sucrose/glycerine-initiated propylene oxide polymer having a hydroxyl number of 456 and a functionality of 4.7.
(b) T-131 - a stannous catalyst, M & T Chemicals Inc., Woodbridge Avenue, Rahway, N.J.
(c) Polycat® 8 - dimethylcyclohexylamine, Abbot Laboratories, Chicago, Ill.
(d) Freon® 11 - trichlorofluoromethane, E.I. du Pont de Nemours & Co., Wilmington, Del.
(e) Mondur® MR - a diphenyl methane diisocyanate, Mobay Chemical Co., Pittsburgh, PA.

EXAMPLE 9

The reaction conditions of Example 8 were repeated excepting that various amounts of the phosphorus-containing polyhydroxy polyethers previously formed were used in the formulation and an additional phosphorus-containing compound was physically incorporated into the foam by adding dimethyl methylphosphorate to the reaction mixture. A control foam containing no phosphorus-containing polyhydroxy polyether was also tested. Results are contained in Table III.

TABLE III

| Polyether | % of Total polyol | % Extra P Added[1] | Density (kg/m³) | Vertical Burn (cm/min)[2] | % Humid Age[3] |
|---|---|---|---|---|---|
| Ex. 1 | 20 | — | 32.8 | — | 13.8 |
|  | 15 | — | 28.5 | — | 4.9 |
| Ex. 2 | 15 | — | 33.3 | 24.1 | — |
| Ex. 6 | 20 | — | 27.2 | 28.9 | — |
|  | 20 | 2 | 29.0 | 24.6 | — |
|  | 15 | — | 27.9 | 24.9 | 6.6 |
| Ex. 7 | 20 | — | 30.1 | 26.9 | 4.9 |
|  | 50 | — | 31.2 | 19.1 | — |
| Control | 0 | — | 32.0 | 33.0 | 3.1 |

[1] Weight percent of dimethyl methylphosphonate based on phosphorus-containing polyhydroxy polyether.
[2] A small foam sample ⅞ in × ¼ in × 3 in (2.2 cm × 0.63 cm × 7.6 cm) is ignited in a controlled atmosphere (25% $O_2$). The amount of time required for the foam to burn 2 inches (5.1 cm) is recorded. The rate is then calculated.
[3] % volume change after 28 days, 70° C., 100% relative humidity.

What is claimed is:

1. Compounds of the formula:

$$R\{\{C_2H_3(Y)O\}_m X\}_n$$

where

R is the residue left by the removal of n active hydrogen atoms from an initiator compound for alkylene oxide polymerization $RH_n$;

Y is independently —H, —$CH_3$, —$C_2H_5$, —$CH_2Cl$, —$CH_2CCl_3$, —$CH_2Br$,

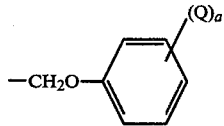

where

Q is independently —Cl or —Br and a=1-5, or —$CH_2OX$ where

X is independently —H or

and

R' and R" are each independently alkyl, phenyl, haloalkyl, halophenyl, alkoxy, haloalkoxy, polyhaloalkoxy, polyhalophenoxy alkoxy, dialkylamino, arylamino, halophenoxy, or alkylhalophenoxy of up to about 20 carbons;

provided that at least one Y is —$CH_2OH$ and at least one Y is

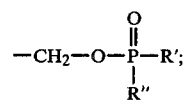

and m and n are integers such that m is at least 2, n being 1-8.

2. The compounds of claim 1 wherein R is the residue of a halogenated hydroxyl compound.

3. The compounds of claim 1 wherein R is the residue of a polyhydroxyl phosphorus compound.

4. The compounds of claim 3 wherein R is the residue of phosphoric or phosphorous acid.

5. The compounds of claim 1 wherein m is from about 5 to about 25.

6. The compounds of claim 1 containing from about 20 to about 60 percent by weight halogen.

7. The compounds of claim 1 containing from about 0.1 to about 20 percent by weight phosphorus.

8. The compounds of claim 1 wherein n is not more than 3.

9. The compounds of claim 1 wherein the initiator is selected from the group consisting of phosphoric acid, phosphorous acid, dibromoneopentyl glycol, 2,3-dibromo-1,4-butenediol, ethylene glycol, 2-butanol, dibromopropanol, pentachlorophenoxy ethanol.

* * * * *

UNITED STATES PATENT AND TRADEMARK OFFICE
CERTIFICATE OF CORRECTION

PATENT NO. : 4,347,194

DATED : August 31, 1982

INVENTOR(S) : Sally P. Ginter, Chester E. Pawloski, and Violete L. Stevens

It is certified that error appears in the above—identified patent and that said Letters Patent is hereby corrected as shown below:

Column 1, line 5, "This is a continuation," should read -- This is a divisional, --.

Column 1, line 6, "filed June 26, 1980," should read -- filed June 25, 1980, --.

Column 1, line 66, "in polymers of" should read -- in polymers or --.

Column 4, line 12, "linear homopolymrs" should read -- linear homopolymers --.

Column 7, line 49, "agent and, and" should read -- agent, and --.

Column 10, line 48, "aluminium chloride" should read -- aluminum chloride --.

Column 14, line 65 and 66, "methylphospho- rate" should read -- methylphospho- nate --.

Signed and Sealed this

Eighteenth Day of January 1983

[SEAL]

Attest:

Attesting Officer

GERALD J. MOSSINGHOFF

Commissioner of Patents and Trademarks